Dec. 14, 1937.                B. CHANCE                2,102,513
                              STEERING MEANS
                         Filed Dec. 24, 1935        2 Sheets—Sheet 1
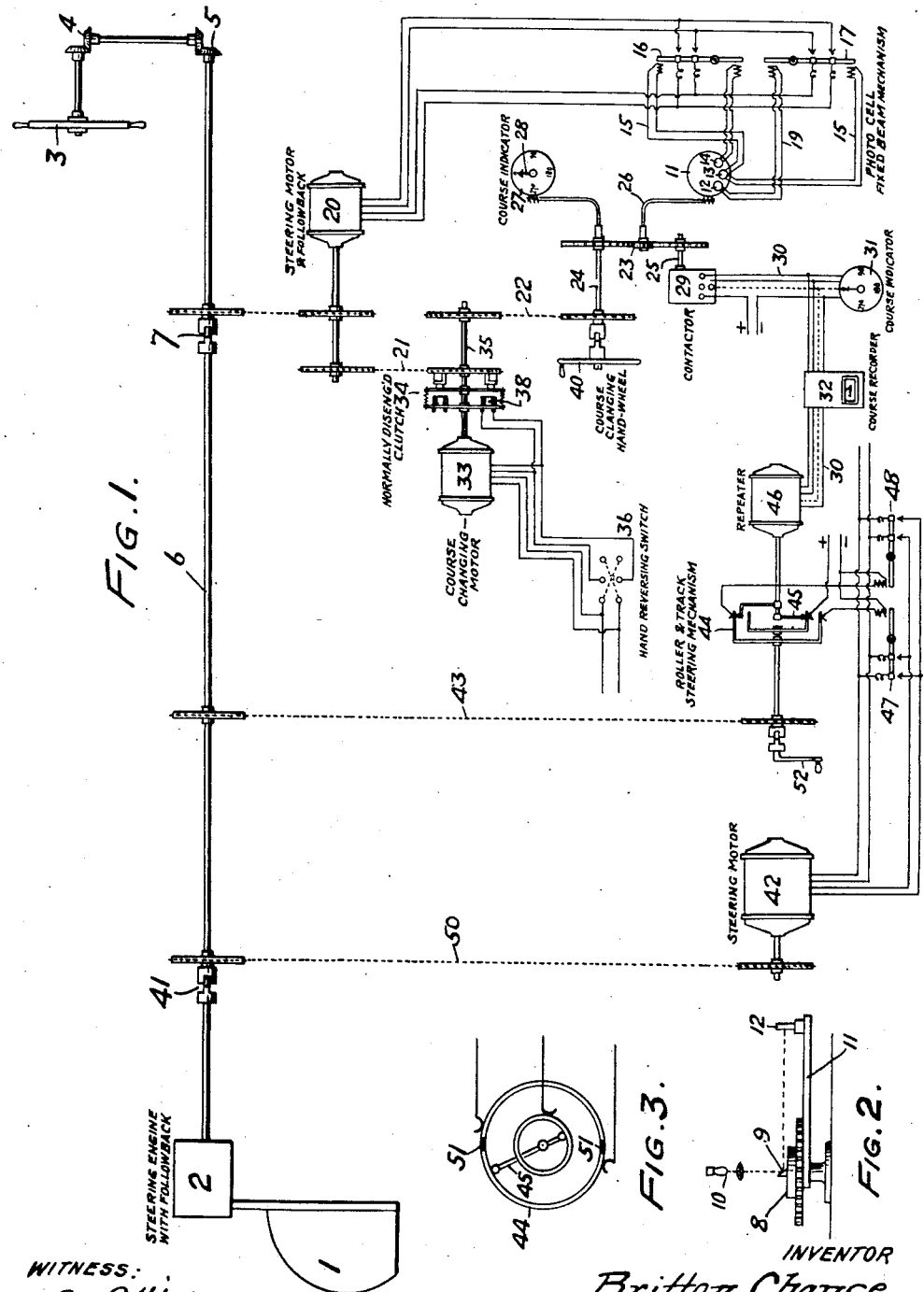
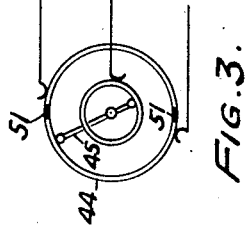
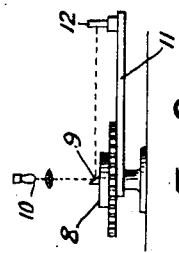
INVENTOR
Britton Chance
BY
Augustus B. Stoughton
ATTORNEY Dec. 14, 1937.    B. CHANCE    2,102,513
STEERING MEANS
Filed Dec. 24, 1935    2 Sheets-Sheet 2

WITNESS:

INVENTOR
Britton Chance
BY
Augustus B. Stoughton
ATTORNEY.

Patented Dec. 14, 1937

2,102,513

UNITED STATES PATENT OFFICE 2,102,513

STEERING MEANS

Britton Chance, Mantoloking, N. J.

Application December 24, 1935, Serial No. 55,975

11 Claims. (Cl. 114—144)

The present invention relates to automatic and other steering means for dirigible vessels, as well as to course indicating, recording, and course changing means, or in other words, hand means for steering the ship and course indicating and changing mechanism independent of the steering means whether hand operated or operated by photo-electric control or by mechanical control; and the objects as well as the invention itself will appear from the following description at the end of which the invention will be claimed.

In the following description reference will be made to the accompanying drawings forming part hereof and in which, Figure 1 is a diagrammatic and schematic view illustrating apparatus embodying features of the invention.

Figure 2 is a side view further illustrating mechanism shown in Figure 1,

Figure 3 is an end view of apparatus also illustrated in Figure 1, and

Figs. 4, 5 and 6 are diagrams hereinafter referred to.

Figure 4:
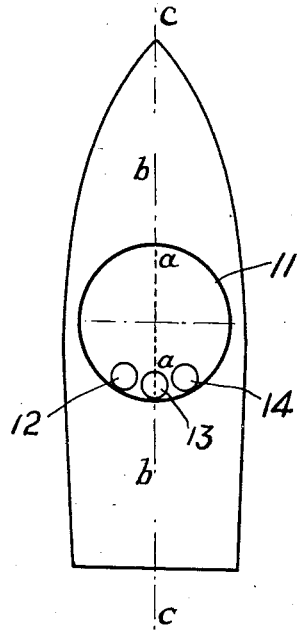
Figure 5:
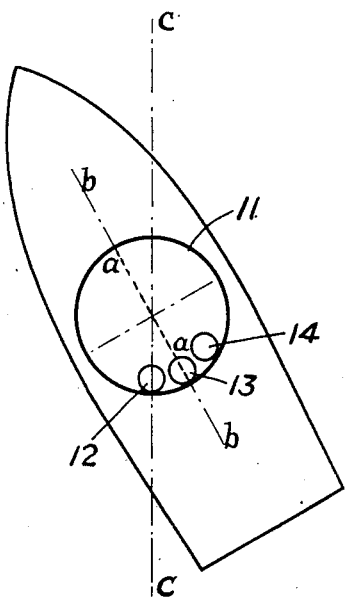
Figure 6:
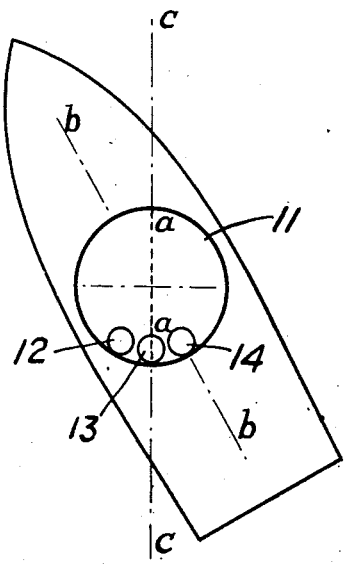

Referring to the drawings, 1 indicates a rudder and 2 the steering engine provided with follow-back mechanism, as is well understood in the art. 3 is a steering wheel for manually steering the vessel. It is geared as by provisions 4 and 5 with a shaft or line of shafting 6 connected through the steering engine 2, or in some cases directly with the rudder. However the vessel may be steered, it is desirable to provide a course indicator with or without a course recorder which may be duplicated and arranged at convenient points throughout the ship. A description will now be given of such a mechanism. The clutch 7 is disengaged from the shaft 6 so that the shaft may be turned without affecting any of the parts connected with the clutch. 8 indicates the card of a magnetic compass or a gyroscopic compass. At the axis of the card there is mounted a reflector 9 upon which falls a beam of light or radiant energy from the source 10. The mirror or reflector 9 reflects this ray into a position fixed in terrestrial space for the reason that it is mounted on the axis of a magnetic compass needle or card. 11 is a carrier turnably mounted about the axis of the compass card and it is provided with photo-electric cells 12, 13 and 14. This system may be gimballed by turning the carrier in respect to the ray of light or energy it is possible for the ray to fall on any of these cells and the incidence of the ray on a cell establishes a substantial flow of current through it. Various means may be employed for turning the carrier 11 in respect to the ray or beam of light. If the carrier 11 is immovable in respect to the ship it must turn with the heading of the ship. Other ways of turning the carrier will be presently described. In the immediately following description the turning movement of the carrier is initiated by change in heading of the ship or, in other words by the ship, and follow-back turning movement of the carrier is effected by mechanism that will be described. In course indicating or recording, change in heading of the ship with respect to the direction established by the beam of light causes the latter to fall upon one or the other of the cells 12, 13 and 14. If the center cell 13 is positioned in the beam of light it is energized and its relay connections 15 serve to hold both the contacts 16 and 17 open. Merely for the sake of description, and referring to Fig. 4, it may be assumed that the center line $a$—$a$ of the carrier 11 through the cell 13 and the center or lubber line $b$—$b$ of the ship are in coincidence and that the beam of light $c$—$c$, fixed in terrestrial space, coincides with the lines $a$—$a$ and $b$—$b$ and falls on the cell 13, and as a modification it may fall upon a blank space between the cells 12 and 14. In either case the motor 20 is at rest. One or the other of the cells 12 or 14 may be brought into the beam of light $c$—$c$ because of change of heading of the vessel which displaces the lines $b$—$b$ in respect to the beam $c$—$c$. Referring to Figure 5 the heading of the ship or line $b$—$b$ has changed in respect to the beam $c$—$c$. The carrier 11 has turned as a unit with the ship and the cell 12 has been moved into the beam $c$—$c$. It may be remarked that the change in heading of the ship may be intentionally brought about by hand steering, or in fact any kind of steering. Under the assumption that the beam falls upon the cell 12, Fig. 5, its relay circuit 19 is energized and the contact 17 is closed with the result that the motor 20, acting as the follow-back, is run in one direction and acting through the sprocket chain 21 and through the sprocket chain 22 and gearing 23 turns the carrier back and the angular turning motion of the carrier is in reverse direction to the turning of the ship and is a function of the turning motion of the ship, and this condition obtains until the cell 13 is brought into position in line with the ray or beam. By way of further explanation the ship and the carrier have been turned as a unit through the angle defined by lines $b$—$b$ and $c$—$c$, in counter-clockwise direction and the carrier 11 has been turned clockwise in respect to the ship through the same angle (Figure 6). Further change in heading of the ship in the same direction puts the cell 12 again in the beam and the described step is repeated. The carrier and the indicator are, the carrier, in respect to the ship, and the indicator 27, in respect to its pointer 28, by increments, turned through an angle substantially corresponding with the angle through which the ship is turned. It may be remarked that the turning of the carrier through substantially the same angle as measures the deviation of the ship affords means which may be applied in a variety of ways in steering means. In this portion of the description it is applied for operating one or more course indicators and/or recorders and for controlling a reversible controller for automatic steering.

If the cell 14, instead of the cell 12, had been brought into line with the beam the contact 16 is closed producing the described result but running the motor in the opposite direction. Inasmuch as the shafts 24 and 25 and the shaft 26, which turns the carrier 11, are by the gearing 23 turned in synchronism the shaft 24 may be used as a means for driving the course indicator 27 which is shown as a disk turned in respect to an adjustably fixed pointer 28. Similarly the shaft 25 may be used to drive a contactor 29, which through electrical connections 30, drives another course indicator 31, and also a course recorder 32.

To change the course use is made of the motor 33. The motor clutch 34 is normally engaged on the shaft 35, but when the hand operated reversing switch 36 is thrown in one direction or the other to change the course the motor 33 is run in one direction or the other and at the same time the clutch 34 is disengaged so as to free the shaft 35 from chain sprocket 21 by reason of the circuit 37 which energizes the magnets 38 of the clutch. The operation of the motor 33 is to turn the shaft 35, shaft 24, gearing 23, and the gearing 23 turns the carrier 11 which establishes a new course and at the same time the course indicators 27 and 31 and the course recorder 32 are appropriately operated. The hand wheel 40 may be engaged with the shaft 24 and used to turn the gearing 23 and in that way establish a new course. It may be remarked that by turning the carrier 11 the position of the cells 12, 13 and 14 is angularly changed in respect to the beam which is fixed in space and therefore equilibrium is not established until the heading of the ship shall have brought the beam into incidence with the cell 13.

To automatically steer the ship by the photoelectric mechanism described the clutch 7 is engaged. The motor 20 is then a steering motor and the follow back is in accordance with rudder movement by way of shaft 6, sprocket 21, shaft 35, and connections 22, 24, 23 and 26. Assuming that the group of electronic devices has been so positioned on the ship that the ray or beam of light falls on the middle cell 13 when the ship is headed in the desired course, it is evident that the steering motor 20 is at rest and the rudder is consequently at rest. Now if the ship's heading changes or deviates from the established course either the electronic device 12 or 14 is brought into line with the beam or ray and is therefore energized. The effect of energizing either of these electronic devices is to cause it, acting through its relay circuit and the appropriate one of the circuit closers 16 and 17, to run the motor 20 in one direction or the other to bring the heading of the ship back to its established course. The turning motion of the rudder transmitted through the gearing 21, 22, 23 and 26 turns the carrier 11 so as to keep the cell 13 in line with the beam whereupon the steering motor 20 again comes to rest. During the described operation the course indicators 27 and 31 and the course recorder 32 are operated in synchronism with the gearing 23 and in that way indicate and record the course pursued by the ship or the change in heading of the ship in pursuing that course.

Throughout this description it has been assumed that the clutch 41 was disengaged and a description will now be given of the use of the apparatus for steering by means of mechanical control. For that purpose the clutch 41 is engaged and the clutch 7 is disengaged. The motor 42 is now used as a steering motor and the sprocket 43 is a means for a follow-back. The follow-back 43 drives the circular contact track element 44 and the roller contact element 45 is driven, for example, from a repeater motor 46. The repeater motor 46 may be driven from the circuit 39 which is controlled by the photo-electric cells 12, 13 and 14 with respect to their position with reference to the beam or ray of light or energy fixed in space. The repeater 46 turns in one direction or the other in response to heading of the ship from the established course, and in doing so it closes one or the other of the relay contacts 47 and 48 thus turning the steering motor 42 in one direction or the other and the steering motor 42 through the sprocket chain 50 turns the steering shaft 6 in one direction or the other. The follow-back acting by way of the sprocket chain 43 turns the track element 44 until the follow-back again establishes a position in which the rollers rest upon the insulation 51 and the motor 42 is at rest. 52 is a hand wheel or crank by means of which the track 44 which carries the insulation 51 may be shifted or turned in order to change the course. The repeater motor 46 may be replaced by a mechanical device such as gear wheels from shaft 25 in much the same way as the course indicator is driven.

The dial 27 may be provided with compass indications and it and the indicator 28 are relatively adjustable to correct for error of compass, or to synchronize the indicator with other parts of the apparatus. This also applies to course indicator 31 and course recorder 32.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. Apparatus for steering a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, means whereby said motor may be connected at will to said mechanism to actuate said rudder automatically, a second motor, means actuated by said first motor for controlling said second motor, and means whereby said second motor may be connected at will to said mechanism.

2. Apparatus for steering and indicating the course of a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, means whereby said motor may be connected at will to said mechanism to actuate said rudder automatically, a second motor, means operable by said beam-responsive devices for controlling said second motor, and means whereby said second motor may be connected at will to said mechanism.

3. Apparatus for steering and indicating the course of a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, means whereby said motor may be connected at will to said mechanism to actuate said rudder automatically, manually operable means for effecting relative movement between said beam and said devices to change the course of the craft during automatic actuation of said rudder, a second motor, means actuated by said first motor for controlling said second motor, and means whereby said second motor may be connected at will to said mechanism.

4. Apparatus for steering and indicating the course of a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, means whereby said motor may be connected at will to said mechanism to actuate said rudder automatically, manually controllable electrically operable means for effecting relative movement between said beam and said devices to change the course of the craft during automatic actuation of said rudder, a second motor, means actuated by said first motor for controlling said second motor, and means whereby said second motor may be connected at will to said mechanism.

5. Apparatus for steering a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, a second motor, means whereby said second motor may be connected at will to said mechanism to operate said rudder automatically, means including a reversible switching device having a neutral position for controlling said second motor, means operable by said beam-responsive devices for actuating said switching device, and follow-back means operable by said mechanism to restore said switching device to its neutral position.

6. Apparatus for steering a dirigible craft having a rudder, comprising means for providing a beam of radiant energy, a plurality of devices selectively responsive to said beam, means for effecting relative movement between said beam and said devices in response to change of the course of said craft, whereby one of said devices is selectively activated, a motor, means controllable by said devices for actuating said motor, means actuated by said motor for effecting follow-back relative movement between said beam and said devices, manually operable mechanism for actuating said rudder, a second motor, means whereby said second motor may be connected at will to said mechanism to operate said rudder automatically, means including a reversible switching device having a neutral position for controlling said second motor, means operable by said beam-responsive devices for actuating said switching device, follow-back means operable by said mechanism to restore said switching device to its neutral position, and manually operable means for actuating said switching device to change the course of the craft during automatic operation of said rudder.

7. Apparatus for steering a dirigible craft having a rudder, comprising means for providing a beam of radiant energy, means responsive to said beam, means for causing said beam to activate said beam-responsive means in response to deviation of the craft from its course, a motor adapted to actuate said rudder, means including a reversible switching device having a neutral position for controlling said motor, a repeater motor for actuating said switching device means means operable by said beam-responsive means for controlling said repeater motor, and follow-back means responsive to the rudder actuation for restoring said switching device to its neutral position.

8. Apparatus for steering a dirigible craft having a rudder, comprising means for providing a beam of radiant energy, means responsive to said beam, means for effecting relative movement between said beam and said beam-responsive means to cause said beam to activate said beam-responsive means in response to deviation of the craft from its course, a motor, means controllable by said beam-responsive means for actuating said motor, a driving mechanism operable by said motor, means operable by said driving mechanism for effecting follow-back relative movement between said beam and said beam-responsive means, manually operable mechanism for actuating said rudder, and means whereby said motor may be connected at will to said rudder-actuating mechanism to actuate said rudder automatically.

9. Apparatus for steering a dirigible craft having a rudder, comprising means for providing a beam of radiant energy, means responsive to said beam, means for effecting relative movement between said beam and said beam-responsive means to cause said beam to activate said beam-responsive means in response to deviation of the craft from its course, a motor, means controllable by said beam-responsive means for actuating said motor, a driving mechanism operable by said motor, means operable by said driving mechanism for effecting follow-back relative movement between said beam and said beam-responsive means, manually operable mechanism for actuating said rudder, means whereby said motor may be connected at will to said rudder-actuating mechanism to actuate said rudder automatically, and manually operable means for actuating said driving mechanism to vary the relation between said beam and said beam-responsive means and thereby change the course of the craft during automatic actuation of said rudder.

10. Apparatus for steering a dirigible craft having a rudder, comprising means for providing a beam of radiant energy, means responsive to said beam, means for effecting relative movement between said beam and said beam-responsive means to cause said beam to activate said beam-responsive means in response to deviation of the craft from its course, a motor, means controllable by said beam-responsive means for actuating said motor, a driving mechanism operable by said motor, means operable by said driving mechanism for effecting follow-back relative movement between said beam and said beam-responsive means, manually operable mechanism for actuating said rudder, means whereby said motor may be connected at will to said rudder-actuating mechanism to actuate said rudder automatically, and manually-controllable electrically-operable means for actuating said driving mechanism to vary the relation between said beam and said beam-responsive means and thereby change the course of the craft during automatic actuation of said rudder.

11. Apparatus for steering a dirigible craft having a rudder, comprising means for providing a beam of radiant energy, means responsive to said beam, means for effecting relative movement between said beam and said beam-responsive means to cause said beam to activate said beam-responsive means in response to deviation of the craft from its course, a motor, means controllable by said beam-responsive means for actuating said motor, a driving mechanism operable by said motor, means operable by said driving mechanism for effecting follow-back relative movement between said beam and said beam-responsive means, a second motor adapted to actuate said rudder, means including a reversible switching device having a neutral position for controlling said second motor, means operable by said driving connection for actuating said switch device, and follow-back means responsive to the rudder actuation for restoring said switching device to its neutral position.

BRITTON CHANCE.